W. R. McGOWEN.
AUTOMOBILE BUMPER.
APPLICATION FILED DEC. 16, 1921.
1,411,052.  Patented Mar. 28, 1922.
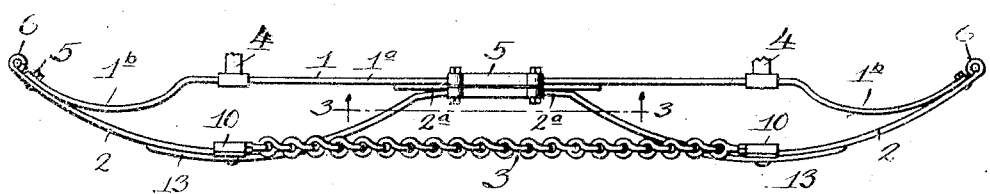
Fig. 1
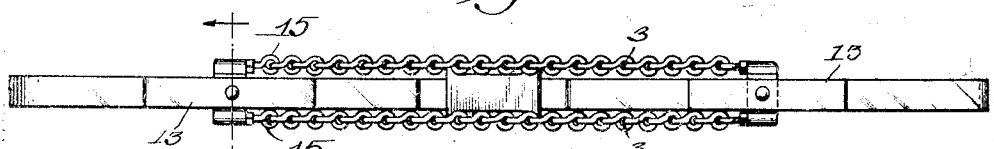
Fig. 2
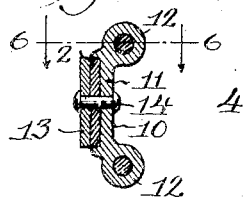
Fig. 5
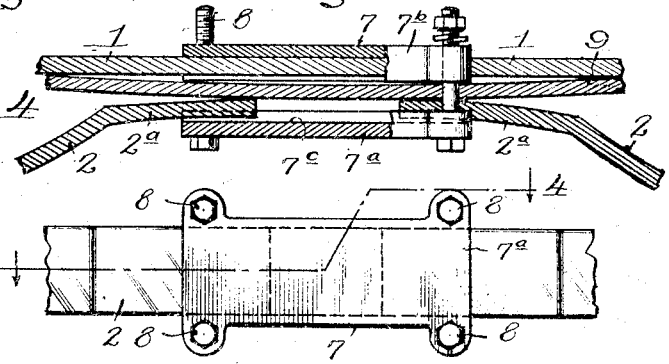
Fig. 4
Fig. 3
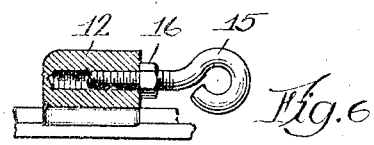
Fig. 6
Inventor,
William R. McGowen,
By Attys.

UNITED STATES PATENT OFFICE.

WILLIAM R. McGOWEN, OF CHICAGO, ILLINOIS.

AUTOMOBILE BUMPER.

1,411,052.   Specification of Letters Patent.   Patented Mar. 28, 1922.

Application filed December 16, 1921. Serial No. 522,782.

*To all whom it may concern:*

Be it known that I, WILLIAM R. Mc-GOWEN, a citizen of the United States, and a resident of Chicago, in the county of Cook and State of Illinois, have invented certain new and useful Improvements in Automobile Bumpers, of which the following is a specification.

This invention relates to improvements in automobile bumpers, and more particularly to protective devices which are mounted at the forward and rear ends of automobiles for the purpose of absorbing and resisting the impact in the event of collision with other automobiles.

The object of the invention is to provide a construction for a bumper combining those qualities which are most desirable to be obtained; namely, an increased capacity for absorbing the maximum impact of collision within the bumper structure without suffering injury or breakage, together with simplicity and lightness in weight, to the end that its presence on an automobile will not materially increase the load to be carried or detract from the appearance thereof by reason of a cumbersome or massive construction.

A further object of the invention is to provide in a bumper of the so-called resilient bar type, certain improved features of construction calculated to accomplish a more satisfactory distribution of the impact and a more complete absorption of shock throughout the bumper structure.

A preferred construction for a bumper embodying among others the specific as well as general object of the invention, is fully disclosed in the accompanying drawings, in which:

Fig. 1 is a top plan view of the bumper,

Fig. 2 is a view in front elevation of the bumper,

Fig. 3 is an enlarged detail view in front elevation of the connection between the bars of the central portion of the bumper, Fig. 4 is an enlarged detail view in horizontal section showing the parts disclosed in Fig. 3 as taken on line 4—4 of Fig. 3.

Fig. 5 is an enlarged cross-sectional view taken on lines 5—5 of Fig. 2 and showing the members connecting the ends of the chains to the impact bars, and Fig. 6 is a detail view taken on line 6—6 of Fig. 5.

As clearly shown in Figs. 1 and 2 the bumper comprises in general the following parts, assembled to form the complete bumper structure, namely, a rear or main bar 1 extending throughout the length of the bumper and adapted for direct connection to a vehicle through the medium of suitable attaching and supporting brackets, and an impact member or portion, spaced forwardly of the rear bar 1 and comprising two forwardly curved and semi-elliptical shaped bars 2—2, extending substantially throughout one-half the length of the bumper and joined at their ends to the extremities of the rear bar, 1, and at the central portion thereof in a manner hereinafter to be described, and finally a pair of parallel and vertically spaced impact members in the form of lengths of linked chain 3—3 attached at their ends to the bar members 2—2 at points substantially intermediate their ends and forming the central impact portion of the bumper.

The bars 1 and 2 are preferably made of resilient flat bar stock with their greatest dimension disposed in a vertical plane so that they are yieldable in a horizontal direction and relatively non-yieldable in a vertical direction. Referring to the rear bar 1 the same is preferably bent to provide a straight central portion 1ª extending substantially throughout the width of the automobile frame, and forwardly and outwardly curved end portions 1ᵇ—1ᵇ. Suitable brackets 4—4 are secured to the straight central portion 1ª just inwardly from the curved portions 1ᵇ.

The bars 2—2, forming two halves of the resilient impact member of the bumper structure, are separate units of semi-elliptic shape, each being secured at its outer end by means of a bolt or rivet 5 to the ends of the rear bar 1, the extremity of each bar 2 being bent rearwardly and inwardly to form a loop or eye 6, immediately adjacent to the bolt, thereby forming a rounded extremity at each end of the bumper as well as covering, to some extent, the head of the bolt thereby preventing the same from being exposed, with the attendant possibility of objects being caught thereon. The elliptic bars 2—2 curve forwardly and inwardly from these outer ends toward the central portion of the bumper, terminating in straight end portions 2ª—2ª, adapted to project endwise toward each other in substantially parallel relation to the rear bar 1 and in close proximity thereto.

The free end portions of the bars 2ᵃ are secured or anchored within a clamping block 7, consisting of two front and rear companion plates 7ᵃ and 7ᵇ, bolted together by transverse bolts 8 extending through the corners thereof above and below the bars. Each plate is channelled horizontally on its inner face, forming in the core of the rear plate a seat for the rear bar, and in the core of the front plate a guide channel 7ᶜ in which the end portions 2ᵃ may slide; also secured by means of a clamping block 7 and extending between the bar 1 and end portions 2ᵃ—2ᵃ is a short reinforcing bar 9, the same being a short piece of the same material as the bars 1 and 2 and having a slight degree of curvature from end to end as clearly shown in Fig. 4, the parts as shown in this figure assuming the positions they would take if the plates of the clamping block were loosened. The reinforcing bar is preferably positioned so that the concaved side thereof faces toward the rear bar 1. This reinforcing bar serves two purposes, first to reinforce the rear bar against flexing under the shock of impact as will hereinafter be described more in detail and furthermore to exert a constant tension against the end portions 2ᵃ of the bars 2—2, thereby retaining them more securely with the guide channel 7ᶜ and eliminating any tendency to vibrate and cause rattling at these points.

As already described the central portion of the impact member consists of two lengths of chain 3—3, extending parallel with each other and with the rear bar 1, one chain being located immediately above and the other immediately below the bars 2—2. The ends of the chains 3—3 are anchored in brackets 10—10 and fastened to the eliptic bars 2—2 at points substantially intermediate their ends. These brackets may be of any suitable design or construction and herein illustrated as consisting of a channel plate 11 extending transversely of each bar 2 and fitting against the rear face thereof, and having cylindric shaped heads 12—12 extending above and below the bars 2—2. As clearly shown in Figs. 1 and 5 the bars 2—2 are preferably reinforced adjacent the points where the brackets 10 are mounted, by means of short bar sections 13—13 extending a short distance either side of said points of connection, the brackets 10—10 being secured in place by rivets 14 extending through and anchored in the double thickness of metal, consisting of the bar 2 and the reinforcing section 13. Anchored in these heads 14—14 are eye-bolts 15—15 extending horizontally and laterally from said heads and are secured to the ends of the chains 3—3. These eye-bolts are adjustable longitudinally and provided with lock nuts 16 so that any slackness in the chains may be eliminated if necessary.

The structure thus described and illustrated presents an impact surface wherein the central portion consists of a flexible, as well as a resilient member, in the form of linked chains spaced apart vertically, thereby forming an impact surface somewhat wider than the resilient bars and presenting an increased protective area immediately in front of the more vital parts of the automobile. The remaining portion of the impact surface consists of the single resilient bars 2—2 and particularly the portions thereof from the brackets 10—10 to their outer extremities.

Considering now the action of the structure under impact, let it be assumed first that a blow is received at the center of the chain portion. The chains being flexible are readily distorted in the direction of the force at the point of impact, the tendency being for the chain to assume a V-shape, contours more or less exaggerated depending on the force of the impact, and the ends of said chains to be drawn closer together. Furthermore the flexibility of the chain makes it impossible for any portion of the shock to be absorbed thereby, the entire force being transmitted to the bars 2—2 along straight lines from the point of impact to the point of connection with said bars, these lines being in angular relation to each other, and substantially tangential to the curvature of the bars 2—2. The transmission of the shock from the point of impact is therefore in the nature of a tension exerted tangentially to the bars 2—2, the result being that the force of the impact is absorbed by the flexing and elongation of the bars 2—2 as well as the flexing of the rear bar 1—1, the elongation of the bars 2—2 producing movement of the free end portions 2ᵃ—2ᵃ in the nature of an endwise sliding in the clamping block 7 and toward each other.

Should the force of the impact delivered against the central portion of the chains 3—3 be sufficient to drive the chains backwardly and into contact with the clamping block 7, the rear bar would then be called upon to directly resist a portion of the shock. Under these conditions the reinforcing bar 8 functions to strengthen the rear bar in the vicinity of the point of impact and to resist that force which would tend to flex and permanently distort the rear bar.

If the shock of impact is received on either side of the central point of the bumper, and particularly against the chains, the action of the structure in absorbing and distributing the impact being the more as heretofore described, with the exception that the tension delivered to the bars 2—2 in the nature of a pull toward the central points would be inversely proportional to the distance from said central point to the end; that the resisting effort to the impact, is equalized, and thus uniformly absorbed. Again an impact received full against either bar, outwardly beyond the chains, is partially absorbed by the bar thus struck, although a portion would be transmitted to the other bar through the medium of the tension exerted by the chains.

Thus under all conditions of impact the structure yields readily to the blow, but the resistance offered depends not so much on the resiliency of any particular bar, but in the distribution of the force throughout the entire structure.

Having described the construction best disclosing the novel features of the invention, I claim:

1. An automobile bumper, comprising an impact member consisting of resilient bars extending inwardly from the ends of the bumper and rearwardly throughout the central portion thereof, with free end portions capable of endwise sliding movement, and a flexible tension member connecting said bars at points intermediate their ends.

2. An automobile bumper comprising a main bar extending throughout the length thereof, an impact member spaced forwardly of said main bar and consisting of impact bars extending inwardly from the ends of said main bar and terminating at the central portion of the bumper, in free end portions, said sections being capable of endwise movement.

3. An automobile bumper comprising a main bar extending throughout the length of said bumper, an impact member spaced forwardly of said main bar and consisting of separate impact bars extending from the ends of said main bar and terminating in free end portions secured in endwise movable relation at the central portion of the bumper.

4. An automobile bumper comprising a main bar extending lengthwise of said bumper, an impact member in front of said main bar, and comprising separate impact bars, extending from the ends of said main bar outwardly from and inwardly toward the central portion of said main bar, and means for connecting the inner ends of said impact bars with said main bar and permitting free endwise movement thereof.

5. An automobile bumper comprising a rear bar and a forward impact member, said impact member consisting of separate resilient bars extending from the ends of said rear bar toward the central portion thereof, and having rearwardly disposed free end portions adapted for endwise movement relative to each other and a clamping member mounted on said rear bar and forming a guide for said free end portions of the impact bars.

6. An automobile bumper comprising a rear bar, a forwardly disposed impact member, consisting of resilient bars extending from the ends of said rear bar toward the central portion thereof, and terminating in free end portions intermediate the ends of the bumper, and a clamping block securing the end portions of said bars to said rear bar, and permitting free endwise movement thereof.

7. An automobile bumper comprising a rear bar and a forward impact member, said impact member consisting of separate resilient bars extending inwardly from the ends of said rear bar toward the central portion thereof, and terminating in free end portions adapted for endwise movement, a clamping member mounted on said rear bar engaging said free end portions of the impact bars, and a short bar inserted between said rear bar and said end portions.

8. An automobile bumper comprising a rear bar, resilient bars curving forwardly from the ends of said rear bar and inwardly toward the central portion thereof, terminating in free end portions adapted for endwise movement under impact, a clamping member securing said free end portions to said rear bar, and permitting free endwise movement thereof, and a longitudinally curved bar inserted in said clamping member and adapted to exert a yielding pressure on said free end portions.

9. An automobile bumper having an impact member comprising resilient bars forming the end portions thereof and capable of elongation under impact and a flexible member connected with said bars at points intermediate their ends.

10. An automobile bumper having an impact member comprising a pair of separate resilient bars, each extending throughout substantially one-half the length of said bumper and capable of endwise movement at one of their ends, and a flexible impact member extending throughout the central portion of the bumper and secured at points intermediate the ends of said bars.

11. An automobile bumper having an impact member comprising resilient bars extending forwardly from the ends of the bumper toward the central portion thereof, and terminating in rearwardly spaced free end portions capable of endwise movement under impact, and a flexible impact member extending between said bars beyond said free end portions.

12. An automobile bumper having an impact member comprising curvilinear bars extending from the ends of the bumper to the central portion thereof, and terminating in rearwardly spaced free end portions capable of free endwise movement under impact, and a flexible impact member fixed at its ends to said bars at points substantially midway of their ends.

13. An automobile bumper having an impact member comprising resilient bars curving forwardly from the ends of the bumper and inwardly to the central portion thereof, and terminating in free end portions capable of endwise movement under impact, and a flexible impact member extending throughout the central portion of the bumper and connected at its ends to said bars at the forwardly disposed points thereof.

14. An automobile bumper comprising a rear bar, extending the length of the bumper, resilient bars extending from the ends of said rear bar and forwardly toward the central portion thereof, and terminating in rearwardly spaced end portions, capable of endwise movement under impact, and a plurality of parallel link chains, extending throughout the central portion of said impact member and fixed at its ends to said bars, said chains being spaced apart in vertical relation.

15. An automobile bumper comprising a rear bar extending lengthwise of said bumper, an impact member in front of said rear bar, and comprising separate impact bars, extending from the ends of said rear bar outwardly from and inwardly toward the central portion thereof, means for securing the free ends of said impact bars in endwise sliding engagement adjacent said rear bar, and a pair of flexible chain members, extending throughout the central portion of said impact member and fixed at their ends intermediate the ends of said front impact bars.

16. An automobile bumper having an impact member comprising resilient bars extending from the ends of the bumper to the central portion thereof, and terminating in rearwardly spaced end portions, capable of endwise movement under impact, and a pair of parallel link chains extending throughout the central portion of said impact member and fixed at their ends intermediate the ends of said bars and above and below the same.

In witness whereof, I hereunto subscribe my name this 14th day of December, A. D., 1921.

WILLIAM R. McGOWEN.